United States Patent [19]

Shikata et al.

[11] Patent Number: 5,041,173
[45] Date of Patent: Aug. 20, 1991

[54] LAPPING TOOLS

[75] Inventors: Toshio Shikata, Tokyo; Hirokazu Tokoro, Kawasaki; Takanobu Nishimura, Yokohama; Masaharu Kinoshita, Tokyo; Norio Masuda, Yamagata, all of Japan

[73] Assignees: Kabushiki Kaisha Toshiba; Toshiba Ceramics Co., both of Tokyo, Japan

[21] Appl. No.: 279,335

[22] Filed: Dec. 2, 1988

Related U.S. Application Data

[60] Division of Ser. No. 178,866, Apr. 1, 1988, Pat. No. 4,867,803, which is a continuation of Ser. No. 842,914, Mar. 24, 1986, abandoned.

[30] Foreign Application Priority Data

Mar. 25, 1985 [JP] Japan .................................. 60-59850

[51] Int. Cl.$^5$ .............................................. C22C 38/02
[52] U.S. Cl. ..................................... 148/321; 148/323; 148/905; 51/293
[58] Field of Search ................... 148/321, 323, 905, 3, 148/902, 910; 420/13, 26, 27; 51/293, DIG. 6

[56] References Cited

U.S. PATENT DOCUMENTS 2,485,760 10/1949 Millis et al. ........................... 420/27

FOREIGN PATENT DOCUMENTS

56-9354 1/1981 Japan ..................................... 420/27

Primary Examiner—Deborah Yee
Attorney, Agent, or Firm—Foley & Lardner, Schwartz, Jeffery, Schwaab, Mack, Blumenthal & Evans

[57] ABSTRACT

Spherical graphite cast iron utilized to prepare a lapping tool is manufactured by casting a molten composition into a mold cavity, and by chilling one side of the resulting casting thereby causing unidirectional solidification, the one side being used as the operating surface of the lapping tool. The molten composition consists of 3.0–3.8 wt. % of carbon, 2.0–2.9 wt. % of silicon, 0.3–0.9 wt. % of manganese, less than 0.05 wt. % of phosphorus, less than 0.03 wt. % of sulfur, 0.2–1.0 wt. % of nickel, 0–0.8 wt. % of copper, 0.05–0.5 wt. % of molybdenum, 0.03–0.09 wt. % of magnesium and the balance of iron. The lapping tool made of this casting has a percentage of sphericity of higher than 80%, graphite particle diameter of less than 100 microns, a density of graphite particles of larger than 70/mm$^2$, and a Vickers hardness of larger than 200.

6 Claims, 8 Drawing Sheets

FIG. IIA

FIG. IIB

LAPPING TOOLS

This application is a division of application Ser. No. 178,866, filed Apr. 1, 1988, now U.S. Pat. No. 4,867,803 which is a continuation of Ser. No. 842,914, filed Mar. 24, 1986 now abandoned.

BACKGROUND OF THE INVENTION

This invention relates to a lapping tool utilized for lapping such articles as a silicon wafer, an optical lens, etc., and a method of manufacturing such a lapping tool.

Although the lapping tool of this invention can be used in many applications, the invention will be described hereunder by taking lapping of a silicon wafer as an example.

When lapping a silicon wafer, the wafer is interposed between rotating upper and lower lapping tools in the form of discs, and abrasive particles in the form of a slurry are supplied between the upper and lower surfaces of the wafer and the inner surfaces of the upper and lower lapping tools. As the lapping tools are rotated under pressure, thin surfaces of the wafer are cut away by the cutting force of the abrasive particles, thus finishing the surfaces of the wafer. In other words, the flatness of the lapping tools is transfer printed onto the surfaces of the wafer.

Such lapping is used to make flat or smooth the surface of a silicon wafer, a jewel, a metal article, optical lens, glass, ceramics, etc. and the demand for lapping is increasing with year as a result of rapid development of electronic technique.

Generally, in the lapping operation of a silicon wafer, fine particles of alumina ($Al_2O_3$) or zirconia ($ZrO_2$) are used as abrasive particles. The particle size of the abrasive particles is directly related to the lapping efficiency, the surface coarseness of the workpiece, and the depth of a surface layer of the workpiece which has residual stress and cracks by lapping. Usually, a particle size of from #1000 to #1200 is used. The lapping property of a silicon wafer is influenced by the affinity or lubrication between the lapping tools and the abrasive particles. When the base material or matrix of the lapping tool consists of steel, the affinity between the abrasive particles and the lapping tool is poor so that after lapping, a large number of scratches are formed on the surface of the workpiece. For this reason, in recent years, cast iron containing graphite is generally used. More particularly, the result of experiment shows that cast iron containing spherical that is spheroidal graphite is especially suitable for lapping a silicon wafer. Thus, the state of crystallization of graphite has a large influence upon the quality of the surface of the lapped silicon wafer, but the optimum condition of the state has not yet been clearly understood.

Although the flatness of the lapping tool has a direct influence upon that of a wafer and since the flatness of the lapping tool is transfer printed on the surface of the wafer, the flatness of the lapping tool is governed by the hardness and uniformity of the lapping tool. The prior art lapping tool made of spherical graphite cast iron utilizes a material having a bull's eye structure corresponding to JIS FCD 45 (JIS means Japanese Industrial Standard) or a material having a ferrite structure corresponding to JIS FCD 40. Both materials have a hardness of about Hv 100–200 (measured with Vickers hardness measuring apparatus under a load of 500 g) so that they are soft and liable to be worn out. For this reason, these materials have a problem of degrading the flatness. Furthermore, the prior art cast iron lapping tool is not homogeneous, so that the lapping tool is lapped nonuniformly by the abrasive particles which presents another problem of degrading the flatness.

During the lapping operation, the lapping tool itself is abraded by the abrasive particles, so that fins are formed at the ends of the grooves formed on the lapping tool. These fins drop onto the surface of the wafer thereby damaging the surface thereof. The larger is the elongation characteristic of the matrix of the lapping tool, more significant is the formation of the fins. This also causes a problem for the ferrite structure of the materials corresponding to FCD 45 and FCD 40. Where the material comprising the lapping tool contains a precipitated phase of hard and coarse carbides of molybdenum, manganese and chromium, for example, or contaminants, those phase and contaminants, the fins would drop off as the lapping tool is worn out and damage the wafer surface.

SUMMARY OF THE INVENTION

Accordingly, it is an object of this invention to provide a novel method of manufacturing spherical graphite cast iron utilized to prepare a lapping tool capable of improving the flatness, maintaining property and the life of the lapping tool, ensuring adequate distribution of graphite, being free from formation of fins at the ends of the grooves and such cast defects as, coarse precipitated carbides, or contaminants, and preventing entrapping of oxides, shrinkage cavity and formation of blow holes which cause surface damage of a workpiece to be lapped such as a silicon wafer, glass lens or the like.

Another object of this invention is to provide a novel lapping tool capable of decreasing as far as possible the wear caused by abrasive particles thus maintaining the flatness and increasing the life of the lapping tool.

According to one aspect of this invention there is provided a method of manufacturing spherical graphite cast iron utilized to prepare a lapping tool comprising the steps of casting into a mould cavity a molten composition consisting of 3.0–3.8 weight % of carbon, 2.0–2.9 weight % of silicon, 0.3–0.9 weight % of manganese, less than 0.05 weight % of phosphorus, less than 0.03 weight % of sulfur, 0.2–1.0 weight % of nickel, 0–0.8 weight % of copper, 0–0.5 weight % of molybdenum, 0.03–0.09 weight % of magnesium and the balance of iron, and chilling one side of resulting casting thereby causing unidirectional solidification, the one side being used as the operating surface of the lapping tool.

According to another aspect of this invention there is provided a lapping tool made of spherical graphite cast iron having a percentage of sphericity of higher than 80%, graphite particle diameter of less than 100 microns, a density of graphite particles of larger than 70/mm$^2$ and a Vickers hardness of larger than 200.

BRIEF DESCRIPTION OF THE DRAWINGS

In the accompanying drawings:

FIG. 1b is a sectional view taken along the diameter of the lapping tool shown in FIG. 1a;

FIG. 2b is a cross-sectional view of the casting mould shown in FIG. 2a;

DESCRIPTION OF THE PREFERRED EMBODIMENTS

Preferred embodiments of this invention will now be described with reference to the accompanying drawings.

Figure 1A:
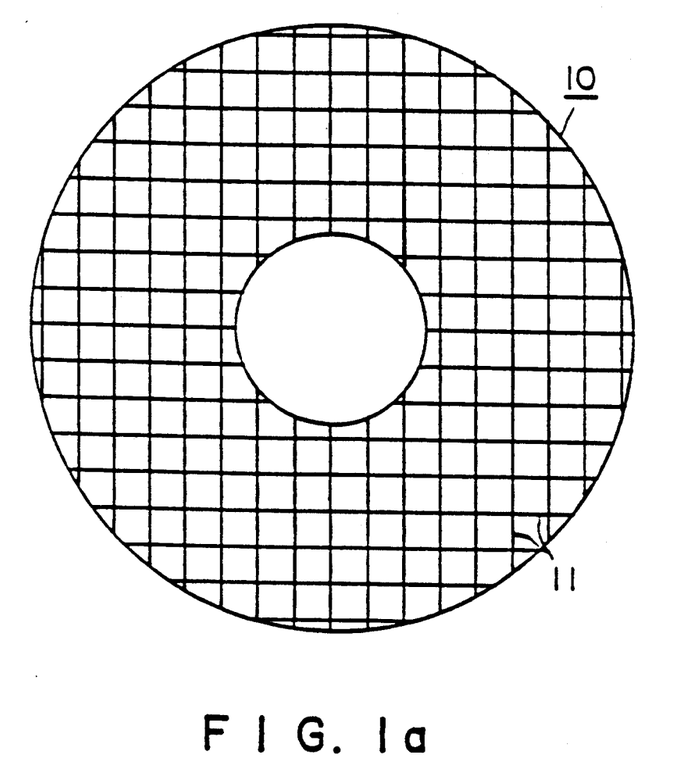
FIG. 1a is a plan view showing the operating surface of a lapping tool according to this invention.
Figure 1B:
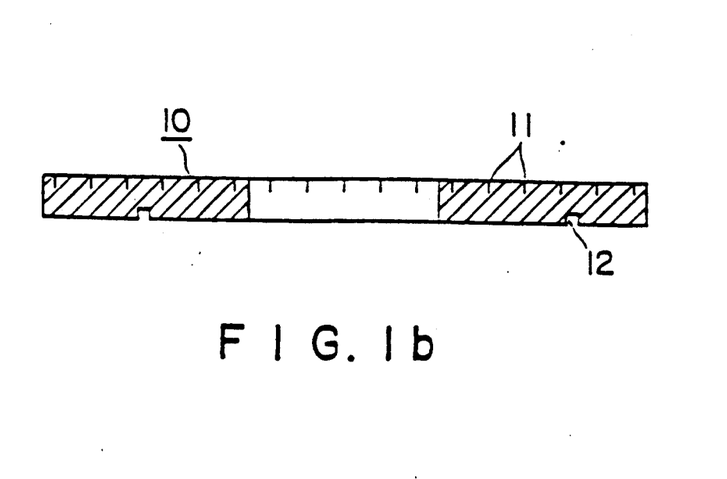

As shown in FIGS. 1a and 1b, the lapping tool 10 embodying the invention has an annular flat disc configuration having an outer diameter of 500-1300 mm, an inner diameter of 100-500 mm and a thickness of 30-60 mm, for example. The operating surface of the lapping tool 10 is provided with a plurality of grooves 11, in the form of a matrix, for example, permitting flow of abrasive particles. Preferred dimensions of the grooves 11 are, width: 1.5-3.0 mm, depth: 10-15 mm, and pitch: 20-40 mm. The other surface is provided with openings 12 for receiving mounting bolts, not shown.

Figure 2A:
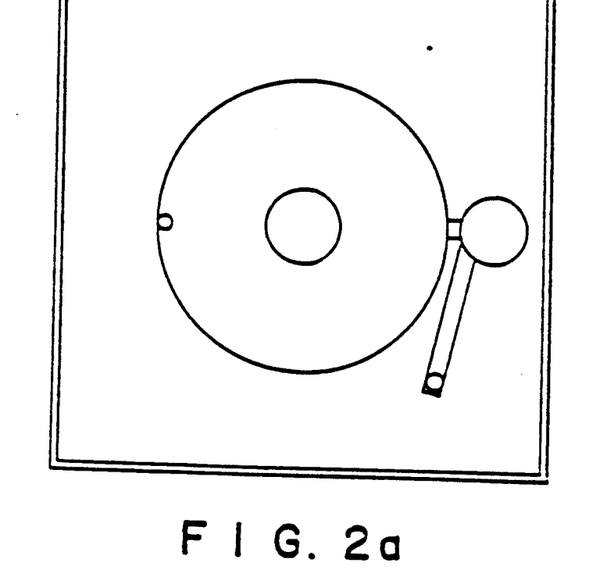
FIG. 2a is a plan view showing a casting mould utilized in the method of this invention.
Figure 2B:
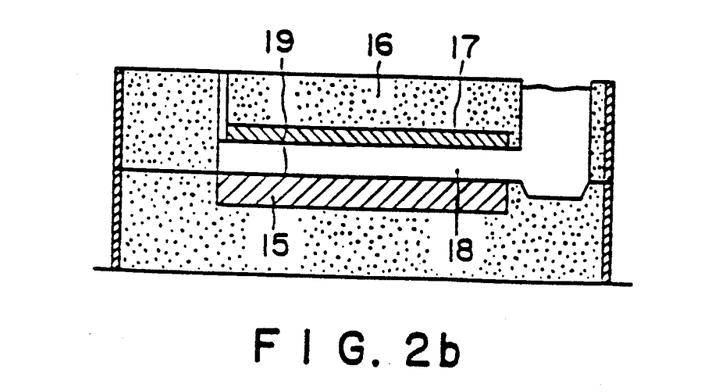

The lapping tool shown in FIGS. 1a and 1b is prepared by using a cast mould as shown in FIGS. 2a and 2b. As shown, a chiller 15 having a thickness of 50-200 mm is provided. On the opposite side of the mould cavity 18 is positioned a conventional sand mould such as a furan mould 16 or a sand mould added with a heat insulating member 17. When cast iron is cast into the mould cavity 18, the cast metal solidifies starting from the lapping surface 19 or the surface in contact with the chiller 15, thereby undergoing so-called unidirectional solidification.

With this casting mould, the lower half of the cast lapping tool is chilled by the chiller 15 thereby not only to obtain a fine distribution of graphite but also to accelerate decomposition of carbides crystallized at the time of solidification. Especially, such elements as manganese and molybdenum which are alloyed for the purpose of improving heat hardening property have a tendency of forming carbides which are difficult to decompose with ordinary heat treatment. But where a chilled structure is formed with the casting mould described above, there is an advantage that the decomposition of the carbides is enhanced by heat treatment Further, by unidirectional solidification, such casting defects as shrinkage cavities, contaminants, gas holes or the like occur only in the finally solidified portion (upper portion), thus ensuring satisfactory structure of the operating surface of the lapping tool.

The method of heat treatment of this invention will be described with reference to the heat treatment steps shown in FIGS. 3 through 6. Of course, the heat treatments differ from each other depending upon the matrix structure to be obtained. The matrix structure of the material utilized to prepare a lapping tool of this invention is a fine pearlite structure, martensite structure, tempered martensite structure, or bainite structure. First, a method of obtaining a fine pearlite structure will be described with reference to FIGS. 3 and 4.

Figure 3:
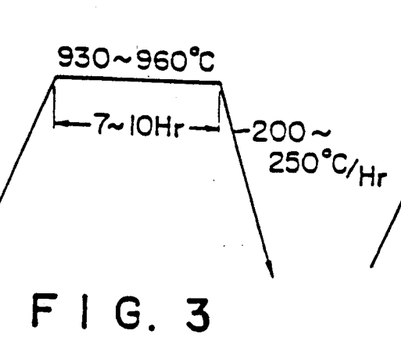
FIGS. 3 and 4 are graphs showing heat treating steps for different compositions.

FIG. 3 is a graph showing a heat treatment necessary to obtain a pearlite structure where the cast iron does not contain molybdenum, one of the heat hardening enhancing elements, as shown by a composition No. 1 shown in Table I below. For the purpose of converting or decomposing carbides crystallized at the time of casting, the casting is held at a temperature of 930°-960° C. for about 7-10 hours and then air cooled at a rate of 200°-250° C./Hr. For effecting the air cooling, a fan is used to obtain a cooling speed of 200°-250° C./Hr. Further, for the purpose of preventing deformation caused by heat treatment both surfaces of the casting are cooled uniformly.

Figure 4:
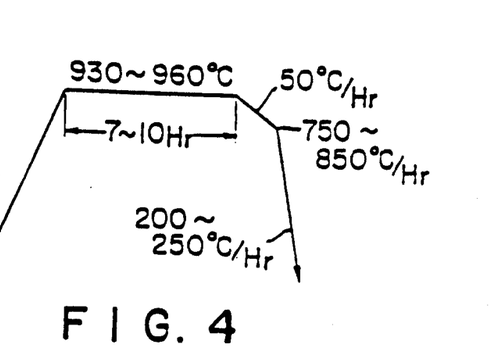

FIG. 4 shows the heat treatment steps for a composition No. 2 shown in Table I in which 0.1-0.5% by weight of molybdenum is used for alloying. With a conventional air cooling there is a danger of forming bainite so that the casting is held at a temperature of 930°-960° C. for 7-10 hours, then cooled in a furnace to a temperature of 750°-850° C. at a rate of 50° C./Hr, and finally air cooled at a rate of 200°-250° C./Hr. It will be noted that FIG. 4 is different from FIG. 3 in that the furnace cooling is added.

The materials thus obtained having a pearlite structure and used for preparing lapping tools are especially suitable for applications where machining is important, and after the machining the lapping tools have excellent flatness and plane accuracy.

Figure 5:
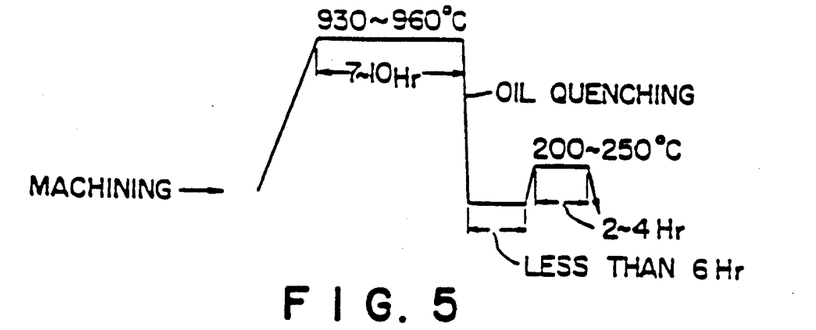
FIG. 5 is a graph showing the steps of heat treatment in which after machining, the workpiece is reheated again and then quenched to obtain martensite structure.

FIG. 5 shows a method of heat treatment for obtaining a martensite structure. The martensite structure has an extremely high hardness of Hv 550-650 so that as its machining is difficult, in this case, the casting is heat treated beforehand to obtain the pearlite structure (see FIG. 4) and then machined leaving a small lapping allowance. Thereafter the casting is again held at a temperature of 850°-960° C. for 2-3 hours and then oil quenched. In order to uniformly cool both surfaces hardening is performed with the direction of oil flow in an oil tank and the surface of the cast iron or the lapping tool held in parallel. In an interval of less than 6 hours, the casting is tempered at a temperature of about 200°-250° C. for two to four hours to increase ductility. Unless molybdenum in composition No. 2 in Table I is alloyed it is difficult to obtain the martensite structure.

Figure 6:
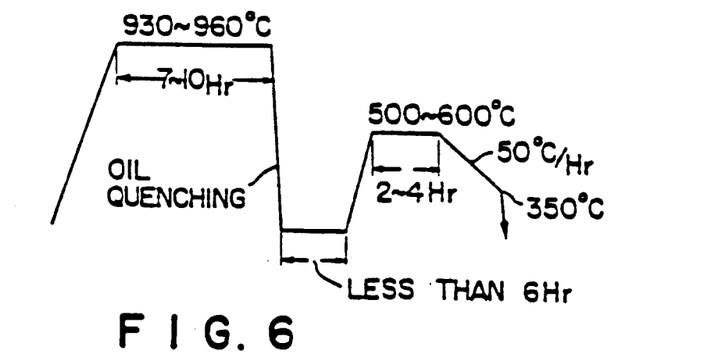
FIG. 6 is a graph showing the steps of heat treatment necessary to obtain tempered martensite structure.

FIG. 6 is a graph showing a method of heat treatment in which the casting is tempered and then subjected to a heat treatment for obtaining martensite structure. The hardness of the tempered martensite structure is controlled to be about Hv 330-400 for enabling machining after heat treatment, for improving the quality of the workpiece, for maintaining the degree of flatness of the lapping tool, and for elongating the operating life thereof. In FIG. 6, as case casting is held at a temperature of 930°-960° C. for 7-10 hours, oil quenched, and held at a temperature of 500°-600° C. for 2-4 hours, for effecting tempering. Then the casting is slowly cooled to 350° C. in a furnace at a rate of 50° C./hour. When the tempering is made under the conditions described above, the hardness of the lapping tool becomes uniform and the stress caused by the heat treatment can be removed whereby a high accuracy can be obtained after machining.

Figure 7:
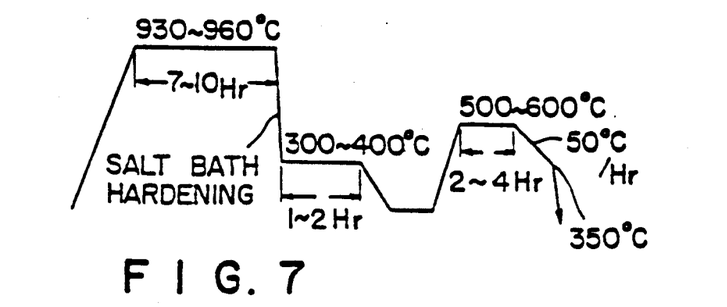
FIG. 7 is a graph showing the steps of heat treatment for obtaining bainite structure.

FIG. 7 is a graph showing the steps of heat treatment for obtaining a bainite structure. Characteristics similar to those of tempered martensite structure can also be obtained with the bainite structure. Like other structures, for the purpose of decomposing carbides, the casting is held at a temperature of 930°-960° C. for 7 to 10 hours and then hardened in a salt bath. According to these steps a hardness of about Hv 400 can be obtained, but in order to make uniform the hardness and to remove the stress it is advantageous to heat the casting or lapping tool to a temperature of 500°-600° C. for 2-4 hours and then cool slowly to a temperature of 350° C. at a rate of 50° C./hour.

In order to obtain the desired characteristic by above described method of casting and method of heat treatment, it is necessary to use compositions shown in the following Table I.

TABLE I

| | C | Si | Mn | P | S | Ni | Cu | Mo | Mg | Fe |
|---|---|---|---|---|---|---|---|---|---|---|
| | | | | (% by weight) | | | | | | |
| No. 1 | 3.0~3.8 | 2.0~2.9 | 0.3~0.9 | less than 0.05 | less than 0.03 | 0.2~1.0 | 0~0.8 | less than 0.05 | 0.03~0.09 | balance |
| No. 2 | 3.0~3.8 | 2.0~2.9 | 0.3~0.9 | less than 0.05 | less than 0.03 | 0.2~1.0 | 0~0.8 | 0.1~0.5 | 0.03~0.09 | balance |

No. 1 shows compositions necessary for converting 100% of the matrix into pearlite structure by heat treatment, while No. 2 shows compositions wherein the matrix is converted into martensite, tempered martensite and bainite structures by heat treatment.

The reason for selecting these composition ranges will be described as follows. With reference to the composition No. 1, with C of less than 3.0% the quantity of crystallized graphite is too small, thus failing to exhibit the desired characteristics of the lapping tool. Where the quantity of carbon equivalent (C %+0.3Si %) is larger than about 4.7%, kish graphite would be formed, thus disenabling to obtain valid casting. Usually C and Si are used in quantities such that the carbon equivalent will be contained in a range of 4.3-4.5%. On the other hand, Si enhances graphitization so that where crystallization of carbides is remarkable, Si effectively prevents cracking of the casting. Such cracking is caused by the fact that where the quantity of the crystallized graphite is too small at a portion near the casting surface on the side for which the chiller is provided, a large shrinkage occurs in a high temperature range, thus resulting in a carbide structure having a low intercrystal strength. On the other hand, Mn has a large carbide forming effect. For this reason, for the purpose of preventing cracking of the casting, the quantities of Mn and Si are selected to satisfy a relation Mn %<0.5×Si %−0.6%. Ni and Cu are added as pearlite stabilizing elements, and quantities of (Ni+Cu) of 0.5-1.0% are sufficient. When the quantity of (Ni+Cu) exceeds 1.2%, a residual austenite phase is resulted which decreases workability. It has been known that the component ranges of P, S, and Mg of the first composition are necessary conditions for obtaining ordinary characteristics of the spherical graphite cast iron. Mo is an impurity element of no specific influence so that its quantity is selected to be less than 0.05%.

Turning now to composition No. 2 which is different from composition No. 1 in the quantity of Mo. Mo has a large effect of delaying perlite transformation initiating time of isothermal transformation diagram of cast iron. This effect is enhanced when Ni or Cu of a quantity of larger than 0.5% coexists. When cast iron of composition No. 1 is hardened with water, cracks are formed so that oil quenching is preferred. Where the casting has a thickness of more than 60 mm, even when a martensite structure is formed, it is formed to a depth of about 5 mm from the surface. However, incorporation of Mo in an amount of 0.1-0.5% to No. 2 composition, perfect hardening can be obtained with a thickness of 120 mm. The reason of limiting Mo to 0.5% lies in that molybdenum carbide which is difficult to decompose by the carbide decomposition heat treatment tends to crystallize.

According to the method of this invention, casting free from such casting defects as shrinkage cavities, cracks, blow holes and contaminants and suitable for use as a lapping tool can be obtained. In addition, fine and uniform graphite distribution can be afforded by chilling solidification. Further by subjecting the casting to a heat treatment suitable for the desired matrix structure, fine and uniform matrix with controlled hardness can be obtained. With these treatments, fine pearlite matrix free from coarse carbide, fine pearlite matrix, martensite matrix, tempered martensite matrix and bainite matrix can be obtained. These matrixes do not contain any carbide that causes scratches on the surface of the workpiece, and do not form fins at the ends of grooves on the lapping tool. Since these matrixes improve wear resistant property, the flatness, an essential condition for the lapping tool can be maintained over a long time which greatly elongates the life of the lapping tool.

EXAMPLE 1

Spherical graphite cast iron having composition No. 2 shown in the following Table II was subjected to standard method of melting, treatment for forming spherical graphite, and inoculation treatment and cast in the casting mould described above. The chiller used in this example was a graphite plate having a thickness of 100 mm and furan casting mould was used as the sand mould. The casting had an outer diameter of 1200 mm, an inner diameter of 400 mm, and a thickness of 60 mm. The casting was held at a temperature of 930° C. for eight hours for decomposing carbides and then directly hardened in an oil bath at a temperature of about 60° C. Since oil flows toward upper from lower, the casting was put into the oil bath with the surface of the casting maintained at right angles with respect to the oil surface and cooled in the oil until the temperature of the casting decreases to about 150° C. Following the hardening treatment, the casting was tempered by heating it to a temperature of 570° C. for three hours within 5 hours after the heat treatment.

Figure 8A:
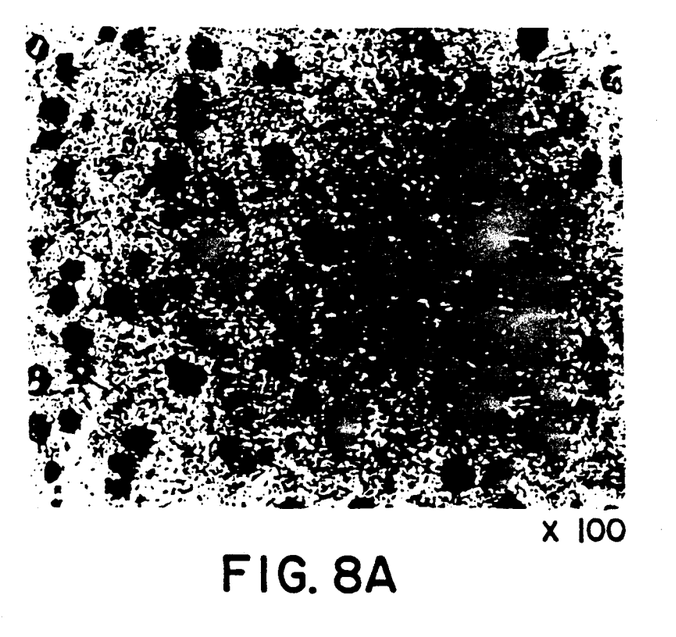
FIGS. 8A and 8B are microphotographs, respectively magnified by 100 and 400, showing graphite distribution in a matrix.
Figure 8B:
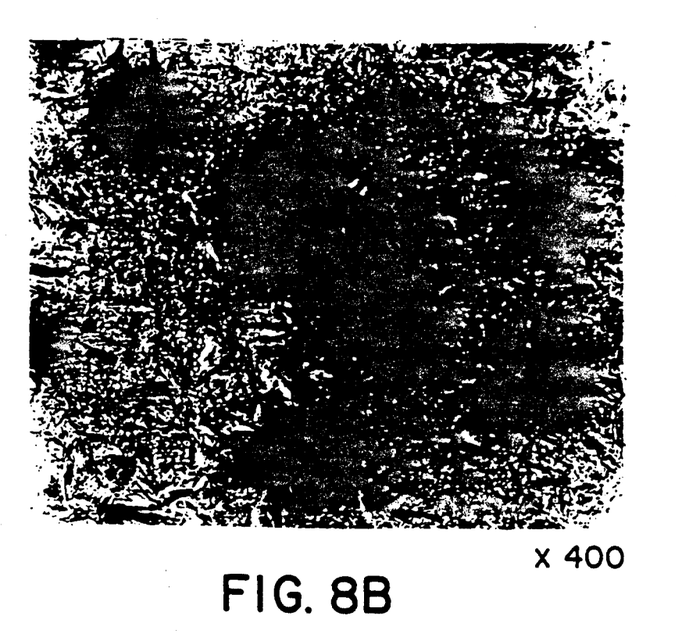

As shown in FIG. 8, according to the method described above, a graphite structure in which the particle size of graphite was 20-40 microns, and the density of graphite was about 90/mm², was uniformly distributed between a surface in contact with a graphite chiller and a depth of about 40 mm. The matrix structure extended over the entire depth and the hardness was changed only a little, that is Hv 380±Hv 10, thereby obtaining a homogeneous structure. For this reason, working of not only a plane but also a grooves and openings was made possible. In other words, subsequent to the heat treatment, final products could be worked to have desired dimensions.

Figure 9:
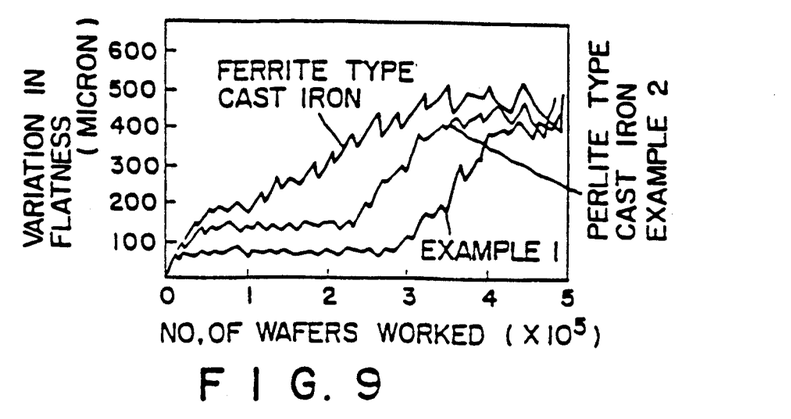
FIG. 9 shows the relation between the variation in the flatness of the lapping tool and the number of silicon wafers lapped.
Figure 10A:
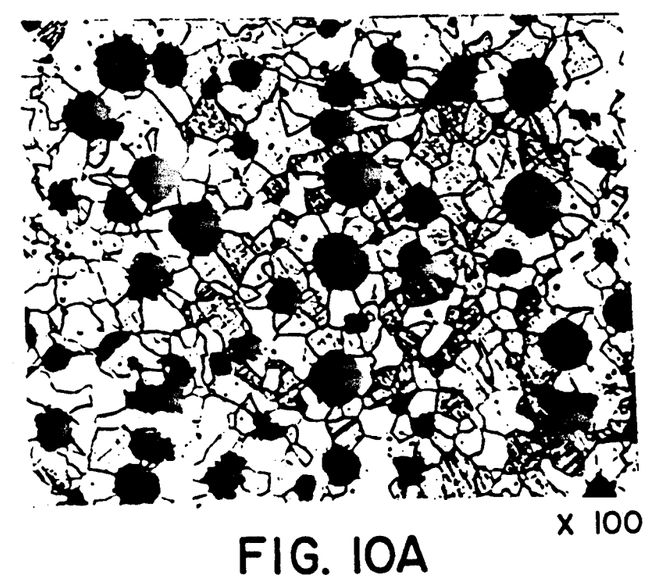
FIGS. 10A and 10B are microphotographs, respectively magnified by 100 and 400, showing graphite distribution in a prior art ferrite type lapping tool.
Figure 10B:
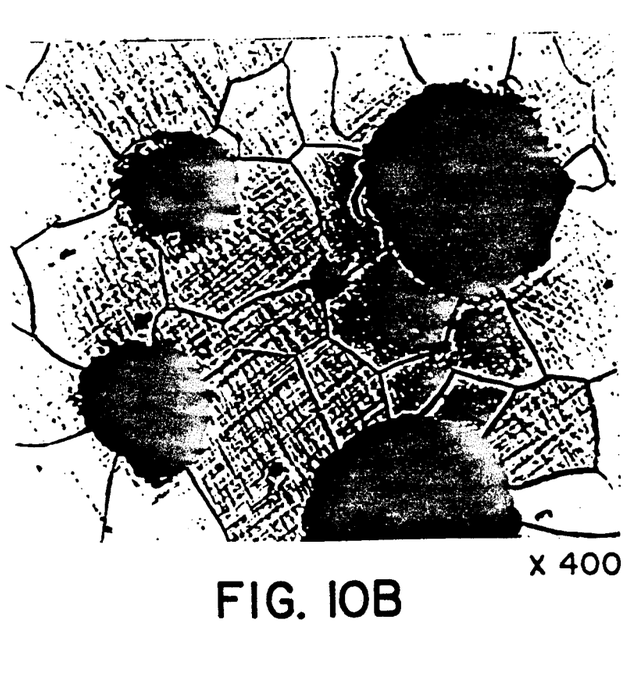

A silicon wafer was lapped by using a lapping tool prepared by the method described above. The result will be described with reference to FIGS. 9 and 10, in which FIG. 9 shows the relation between variation in the flatness of the lapping tool and the number of silicon wafers lapped, each wafer having a diameter of 4 inches (9.16 cm). Comparison of the tempered martensite type lapping tool of this example with a prior art ferrite type lapping tool (the structure thereof is shown in FIG. 10) shows that the flatness stabilizing period at the time of commencement of use is longer in this invention and the total change in the flatness is less than one half of the prior art. The life of the lapping tool depends greatly upon the variation in the flatness and it was found that the life of tempered martensite type lapping tool is 2.2 times of the life of the ferrite type lapping tool.

Figure 11A:
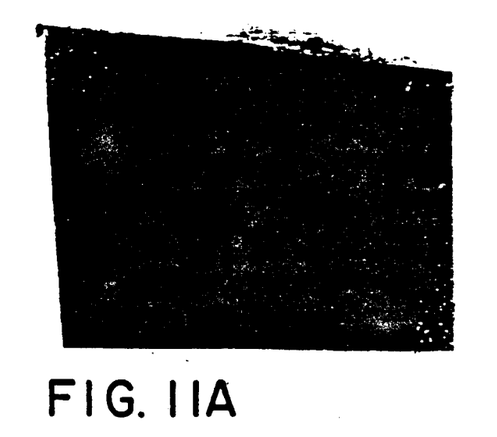
FIGS. 11a and 11b are microphotographs, showing the groove ends of the lapping tool.
Figure 11B:
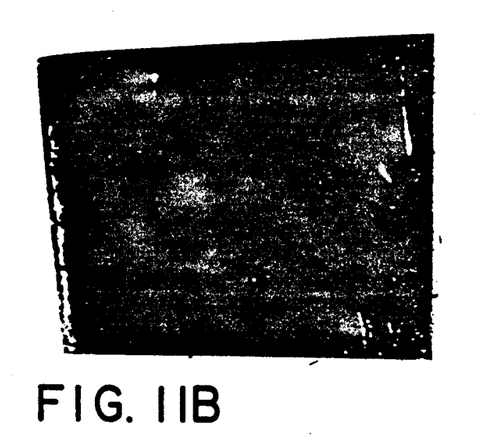

FIGS. 11a and 11b are microphotographs showing the groove ends of the lapping tool after lapping 5000 silicon wafers. FIG. 11a shows the groove end of a ferrite type lapping tool of No. 3 composition shown in the following Table II and shows forming of fins due to friction with the abrasive particles, whereas FIG. 11b shows the tempered martensite type lapping tool according to this invention, from which it can be noted that there is no fin. As is well known in the art, such fins cause to form scratches on the surface of the silicon wafer. Other causes involve coarse carbides precipitated in the lapping tool, hard contaminants, and broken pieces of the silicon wafer.

Figure 12:
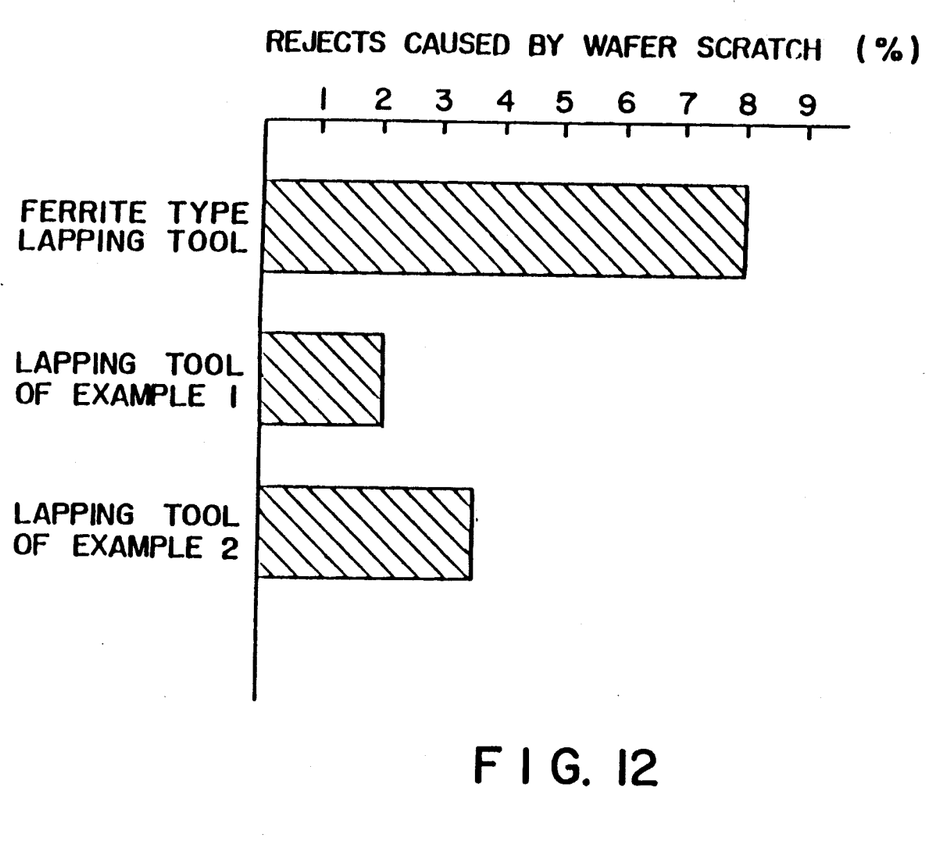
FIG. 12 is a bar graph showing percentage of rejects caused by wafer scratches.

FIG. 12 is a bar graph showing percentage of rejects caused by wafer scratches obtained by lapping test of 10000 silicon wafers. In a tempered martensite type lapping tool of Example 1 the percentage of rejects due to scratches was about 2% which is ¼ of the reject percentage 8% of a herrite type lapping tool.

EXAMPLE 2

Figure 13A:
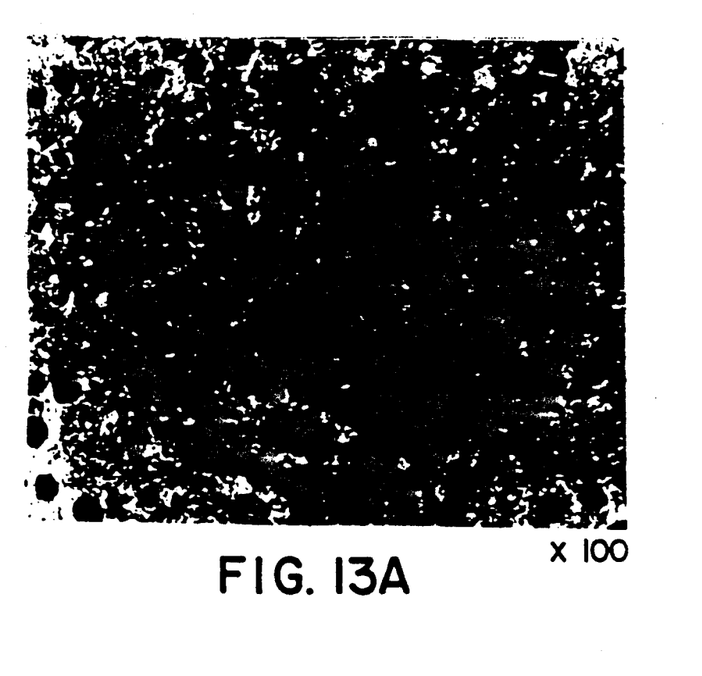
FIGS. 13A and 13B are microphotographs, respectively magnified by 100 and 400, showing graphite distribution in a perlite matrix.
Figure 13B:
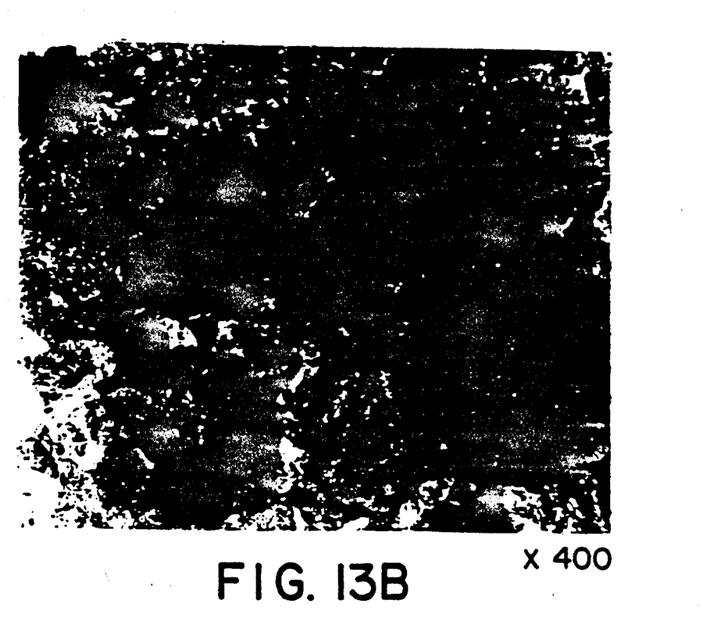

A lapping tool of the same dimension as in Example 1 was prepared by using No. 1 composition shown in Table II. Although the same method of casting was used, the casting was heat treated at a temperature of 930° C. for 8 hours for decomposing carbides and then air cooled. The cooling was made by hanging the lapping tool with a crane thus vertically holding plane surfaces. While rotating the lapping tool thus hung, air was blasted from under with a fan. As a consequence, a matrix of a fine particle structure having a hardness of about 250 Hv±20 Hv as shown in FIG. 13 was obtained. This pearlite type lapping tool had an excellent workability and could work with working steps of about ¼ of those of the tempered martensite type lapping tool of Example 1. Moreover, the flatness was high of the order of 20 microns.

As shown in FIG. 12 the variation in the flatness of the lapping tool according to this example was about 75% of the ferrite type lapping tool. The percentage of rejects caused by scratches of the wafer was about 3.5%. This means that the percentage of rejects caused by scratches can be reduced to less than one half of the ferrite type.

TABLE II

| | Composition of Example 2 (% by weight) | | | | | | | | | |
|---|---|---|---|---|---|---|---|---|---|---|
| | C | Si | Mn | P | S | Ni | Cu | Mo | Mg | Fe |
| No. 1 | 3.5 | 2.5 | 0.5 | 0.05 | 0.01 | 0.6 | trace | trace | 0.05 | balance |
| No. 2 | 3.5 | 2.7 | 0.6 | 0.04 | 0.01 | 0.6 | " | 0.3 | 0.05 | balance |
| No. 3 | 3.6 | 2.8 | 0.3 | 0.05 | 0.01 | trace | " | trace | 0.05 | balance |

As above described, the graphite cast iron has percentage of sphericity of higher than 80%, graphite particle diameter of less than 100 microns, the density of graphite particles of larger than 70/mm² and a Vickers hardness of larger than 200.

These factors were determined according to the following considerations.

The lapping is performed by supplying abrasive particles between the operating surface of the lapping tool and the surface of the workpiece. To perform an efficient lapping it is essential that the surface of the lapping tool must be flat and smooth, that the abrasive particles must be uniform and finely distributed and that they must flow smoothly. The flatness is influenced by the wear of the lapping tool, while the uniformity and fine distribution of the abrasive particles are influenced by the shape, particle diameter and particle distribution of spherical graphite.

In order to uniformly distribute the abrasive particles and enhance uniform flow thereof it is essential to use spherical graphite cast iron rather than flake shaped graphite cast iron and to make smaller the diameter of graphite particles than that of the abrasive particles. Further, it is desirable that graphite particles are small and distribute uniformly as far as possible. Especially, for working a silicon wafer, abrasive particles having a mean diameter of 16 microns are used, so that the diameter of the spherical graphite should be larger than that of the abrasive particles. More particularly in order to uniformly distribute the graphite spheres their diameter should be less than 100 microns, preferably 30-50 microns. Further, preferably the density of graphite spheres must be 70/mm² and the percentage of sphericity should be higher than 80%. To elongate the life of the lapping tool it is essential that the tool should have the characteristic described above to a depth of 15 mm from working surface of the tool.

To demonstrate the effectiveness of the lapping tool of this invention the following Examples 3-6 and a control example are given.

EXAMPLE 3

Spherical graphite cast iron of a composition as shown in the following Table III was cast to obtain a casting utilized for the lapping tool of this invention. Before forming grooves the casting was heated to 930° C. and then air cooled. The structure of the casting was examined with a microscope to a depth of 20 mm and found that the percentage of sphericity was 90%, the diameter of graphite particles was 30-50 microns, and the density was 150/mm². As a result of air cooling, the matrix had a fine pearlite structure and a hardness Hv was 250. This material was machined to obtain a lapping tool which was used to lap a silicon wafer. The results are shown in the following Table IV. Comparison of this material with the prior art JIS FCD 45 showed that the number of rejects was decreased to 75% of JIS FCD 45 and the amount of wear was reduced to 40% of JIS FCD 45. These characteristics are desired ones for the lapping tools.

EXAMPLE 4

Spherical graphite of the composition shown in Table III was cast which was used to prepare a lapping tool of this invention. The percentage of sphericity was 85% to a depth of 20 mm, the diameter of spherical graphite was 30-50 microns, and the density of graphite particles was 70/mm².

The casting was heated to 930° C. and then cooled in a furnace to obtain ferrite structure. After forming grooves and holes, the casting was heated to 930° C. to obtain austenite structure and then austempered at 300° C. to obtain bainite structure. The resulting material had a hardness of Hv 350 and the variation of the surface flatness caused by tempering was corrected by lapping. A silicon wafer was lapped with the lapping tool. As shown in Table IV the surface scratches of the silicon wafer was reduced to 65% of that of JIS FCD 45, and the life was increased by 70%. Further, the amount of wear was reduced to 50% of that of JIS FCD 45. These characteristics are desirable ones for the lapping tool.

EXAMPLE 5

By using the composition shown in Table III spherical graphite cast iron was cast which was used to prepare a lapping tool of this invention. The casting had the percentage of sphericity of 90% to a depth of 20 mm, the diameter of the graphite particles was 30-50 microns and the density of the graphite particles was 70/mm².

The casting was heated to 930° C. and then cooled in a furnace to obtain ferrite structure. After forming grooves on the surface of the lapping tool the casting was heated to 930° C. to transform the structure into austenite structure. Then the casting was austempered at a temperature of 350° C. to obtain bainite structure. The hardness of this material was Hv 300. The variation in the surface flatness caused by tempering was corrected by lapping. As shown in Table IV the surface defect of the silicon wafer was decreased to 70%, the life of the lapping tool was increased by 60% and the amount of wear was reduced by 50%.

EXAMPLE 6

Spherical graphite cast iron of a composition shown in Table III was cast. The percentage of sphericity of the casting was 80% to the depth of 20 mm, the diameter of the graphite particles was 30-50 microns, and the density of the graphite particles was 100/mm². The casting was heated to 930° C. and then cooled in a furnace to obtain ferrite matrix. After forming the grooves and machining the lapping tool it was reheated to 930° C. and hardened with oil. The resulting lapping tool had a hardness of 550 Hv. After hardening, the tool was lapped to correct surface flatness.

This lapping tool was used to lap a silicon wafer. As shown in Table IV, when compared with the prior art JIS FCD 45, the lapping tool of this example could reduce the number of rejects owing to surface scratches to 45%, increase the life to 220% and reduce the amount of wear to 20%.

EXAMPLE 7

Again a casting was prepared by utilizing the spherical graphite cast iron of the composition shown in Table III. The percentage of sphericity was 80% to the depth of 20 mm, the diameter of graphite particles was 50-100 microns and the density of the graphite particles was 100/mm². The casting was heated to 930° C. and cooled in a furnace to obtain ferrite matrix. After forming the grooves the casting was machined into a lapping tool. Then the tool was reheated to 930° C. and hardened in oil to obtain a hardness of 500 Hv. After hardening, the tool was lapped to correct the surface flatness.

This tool was used to lap a silicon wafer. As shown in Table IV, the number of rejects due to surface scratches was reduced to 50%, the life of the tool was increased to 200% and the amount of wear was reduced to 25%.

CONTROL EXAMPLE

Spherical graphite cast iron of the composition shown in Table III (see Control Example) was cast. The percentage of sphericity of the casting was 75% to a depth of 20 mm, the diameter of the graphite particles was 100-150 microns, and the density of the graphite particles was 60/mm². The casting was heated to 930° C. and then cooled in a furnace to obtain ferrite matrix having a hardness of 140 Hv. After heat treatment, the casting was machined into a lapping tool. This tool was used to lap a silicon wafer and the results are shown in Table IV. As shown, the number rejects due to surface scratches, life of the tool, and amount of wear of this tool are inferior than those of the tools of Examples 3-7.

TABLE III

| Composition (%) | C | Si | Mn | P | S | Mg | Ni | Cu | Fe |
|---|---|---|---|---|---|---|---|---|---|
| Exam. 3 | 3.0 | 2.6 | 0.5 | <0.03 | <0.03 | 0.04 | 0.3 | 0.4 | balance |
| Exam. 4 | 3.3 | 2.5 | 1.0 | <0.03 | <0.03 | 0.05 | 0.6 | 0.7 | balance |
| Exam. 5 | 2.7 | 2.7 | 0.9 | <0.03 | <0.03 | 0.06 | 0.5 | 0.5 | balance |
| Exam. 6 | 3.4 | 2.2 | 1.0 | <0.03 | <0.03 | 0.06 | 0.2 | 0.3 | balance |
| Exam. 7 | 3.2 | 2.5 | 0.5 | <0.03 | <0.03 | 0.05 | — | — | balance |
| Control Exam. | 3.6 | 2.8 | 0.3 | <0.03 | <0.03 | 0.04 | — | — | balance |

TABLE IV

| | Test Result | | | | | Hardness | |
|---|---|---|---|---|---|---|---|
| | Lapping tool | | | | | | |
| | No. of rejects | Life | Flatness after 1 month | Amount of wear | Structure | Hv (500 g) | Heat treatment |
| Example 3 | 75 | >150 | 70 | 60 | perlite | 250 | air cooling |

TABLE IV-continued

| | | Test Result | | | | Hardness | |
| | | Lapping tool | | | | | |
| | No. of rejects | Life | Flatness after 1 month | Amount of wear | Structure | Hv (500 g) | Heat treatment |
| --- | --- | --- | --- | --- | --- | --- | --- |
| Example 4 | 65 | >170 | 60 | 50 | bainite | 350 | tempering to obtain austenite |
| Example 5 | 70 | >160 | 65 | 55 | bainite | 300 | tempering to obtain austenite |
| Example 6 | 45 | >220 | 45 | 20 | martensite | 550 | oil quenching |
| Example 7 | 50 | >200 | 50 | 25 | martensite | 500 | " |
| Control Example | 100 | 100 | 100 | 100 | ferrite | 140 | anneal |

What is claimed is:

1. A lapping tool comprised of spherical graphite cast iron, said spherical graphite cast iron having a graphite particle diameter of less than 100 μm, a density of graphite particles greater than about 70/mm$^2$, and a Vickers hardness of greater than about 200.

2. A lapping tool according to claim 1, wherein said spherical graphite cast iron has a percentage of sphericity of higher than 80%.

3. A lapping tool according to claim 1, wherein said spherical graphite cast iron consists of 3.5-3.8 weight % of carbon, 2.0-2.9 weight % of silicon, 0.3-0.9 weight % of manganese, less than 0.05 weight % of phosphorus, less than 0.03 weight % of sulfur, 0.2-1.0 weight % of nickel, 0-0.8 weight % of copper, 0.03-0.09 weight % of magnesium and the balance of iron.

4. A lapping tool according to claim 3, wherein a working surface of said lapping tool is provided with grooves for removing chips formed as a result of lapping.

5. A lapping tool that is the product of a process comprising the steps of
   (A) casting into a mould cavity a molten composition which consists essentially of 3-3.8 weight % of carbon, 2.0-2.9 weight % of silicon, 0.3-0.9 weight % of manganese, less than 0.05 weight % of phosphorus, less than 0.03 weight % of sulfur, 0.2-1.0 weight % of nickel, 0-0.8 weight % of copper, 0.1-0.5 weight % of molybdenum, 0.03-0.09 weight % of magnesium, and the balance of iron, whereby a casting is formed;
   (B) chilling one side of the casting to cause unidirectional solidification, such that said one side presents a surface of a spherical graphite cast iron that is suitable for use as an operating surface of said lapping tool;
   (C) heating said casting to a temperature of 930°-960° C. for 7 to 10 hours to decompose carbides of magnesium and molybdenum;
   (D) quenching the heated casting;
   (E) heating the quenched casting to a temperature of 500°-600° C. for 2 to 4 hours in a period less than 6 hours after said quenching to produce a tempered casting;
   (F) cooling the tempered casting to a temperature of 350° C. in a furnace and then cooling with air to obtain tempered martensite structure, wherein a working surface of said lapping tool is provided with grooves for removing chips formed as a result of lapping.

6. A lapping tool according to claim 1, wherein said lapping tool has a thickness of between about 30 and 60 mm and a diameter of about 500 to 1300 mm.

* * * * *